Nov. 30, 1937.  C. W. NAYLOR  2,100,973
INTERNAL BRAKE
Filed May 26, 1936
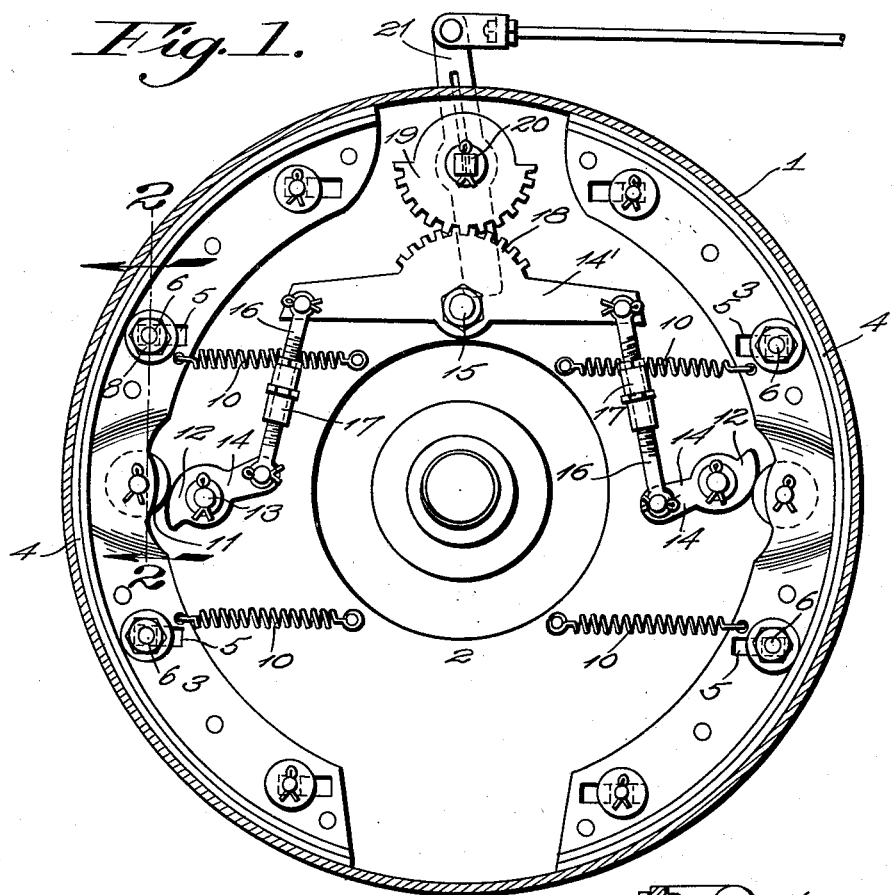
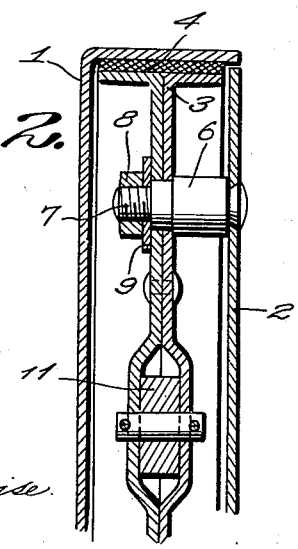
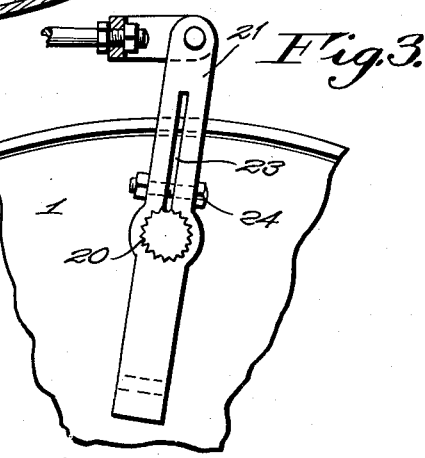
Clayton W. Naylor
INVENTOR
BY Victor J. Evans & Co.
ATTORNEYS
WITNESS Patented Nov. 30, 1937

2,100,973

UNITED STATES PATENT OFFICE 2,100,973

INTERNAL BRAKE

Clayton W. Naylor, Eaton Rapids, Mich.

Application May 26, 1936, Serial No. 81,924

1 Claim. (Cl. 188—78)

This invention relates to brakes for motor vehicles or aeroplanes of the internal type and has for the primary object the provision of a device of this character which may be employed in connection with mechanical, hydraulic or air brake systems and is easily adjusted to cause both shoes to apply simultaneously with equal pressure or one shoe in advance of the other with the linings of the shoes receiving equal wear throughout the lengths thereof.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a brake constructed in accordance with my invention.

Figure 2 is a sectional view taken on the line 2—2 of Figure 1.

Figure 3 is a fragmentary view, partly in section, showing a brake arm.

Referring in detail to the drawing, the numeral 1 indicates a brake drum and 2 a fixed guard plate or support for the brake mechanism operating within the drum. The drum is equipped with a pair of arcuately curved brake shoes 3 each similarly constructed and to which is secured a brake lining 4 extending the full length and width of the brake shoe. The brake shoe is preferably constructed of companion sections riveted or otherwise secured together. The brake shoes are provided with slots 5 to receive supporting pins 6 secured to the support or guard plate 2. The pins are provided with reduced screw threaded portions 7 to receive nuts 8 and washers 9 for retaining the brake shoes assembled on the pins. The pins fitting in the slots permit the shoes to move towards and from the drum and are held away from the latter by the action of contractile springs 10, the springs being secured to the brake shoes and to the support 2.

Rollers 11 are journaled on the brake shoes intermediate the ends thereof and are contacted by cams 12 pivoted to the support 2, as shown at 13. Arms 14 are formed on the cams.

A lever 14' is pivoted to the support 2, as shown at 15, and the ends thereof are connected to the arms 14 by adjustable links or tie rods 16 either of which may be adjusted as to length, turn buckles 17 being provided for the purpose.

The lever 14' adjacent the pivot 15 has formed thereon gear teeth 18 which mesh with teeth of a gear 19. The gear 19 is fixed on a shaft 20 journaled on the support 2 and extends exteriorly of the brake drum and to which a brake arm 21 is detachably secured. The usual brake operating means is connected to one end of the arm 21. The arm 21 is splined to the shaft 20 and is split, as shown at 23. The split portion of the arm has a bolt 24 extending therethrough so that after the application of the arm on the shaft 20 the arm may be drawn tightly thereagainst.

In operation, the movement of the brake arm 21 by the brake operating mechanism in one direction rocks the lever 14' on its pivot which, through the tie rods 16 causes pivotal movement of the cams. The cam being in engagement with the rollers 11 force the brake shoes against the drums with pressure evenly throughout the length of said brake shoes so as to bring about even wear on the full length of the brake lining. The cams are reversely arranged, as clearly shown in Figure 1, and it is also to be noted that the brake shoes as well as the cams may be used in right and left hand manner. The brake shoes may be adjusted by simply lengthening or shortening the tie rods 16. Also through the lengthening of one of the tie rods and shortening of the other tie rod, one of the brake shoes may be caused to contact the drum in advance of the other brake shoe.

Having described the invention, I claim:

A brake including a drum and a fixed support, brake shoes slidably mounted on the support and movable towards and from the drum, brake linings for said shoes, springs acting on said shoes to move them away from the drum, rollers journaled to the shoes intermediate their ends, cams pivoted to the support and acting on said rollers, a lever pivoted on the support, tie rods pivoted to the ends of the lever and to the cams, gear teeth formed on said lever adjacent the pivot thereof, a shaft journaled in said support, a gear secured on said shaft and meshing with the gear teeth of the lever, a brake arm secured to said shaft and adapted to be connected to a brake operating means and means for effecting a minute adjustment of said tie rods as to length whereby to equalize the pressure applied on said drum by each of said shoes and to apply pressure on said drum by one of said shoes in advance of the other.

CLAYTON W. NAYLOR.